(12) United States Patent
Friezner

(10) Patent No.: US 12,044,000 B2
(45) Date of Patent: Jul. 23, 2024

(54) METHOD AND APPARATUS FOR CONTROLLING HAZARDOUS MATERIALS DISPOSED WITHIN A STORM WATER CONTROL SYSTEM

(71) Applicant: Denis Friezner, Boise, ID (US)

(72) Inventor: Denis Friezner, Boise, ID (US)

( * ) Notice: Subject to any disclaimer, the term of this patent is extended or adjusted under 35 U.S.C. 154(b) by 256 days.

(21) Appl. No.: 17/666,136

(22) Filed: Feb. 7, 2022

(65) Prior Publication Data

US 2022/0251819 A1 Aug. 11, 2022

Related U.S. Application Data

(60) Provisional application No. 63/147,503, filed on Feb. 9, 2021.

(51) Int. Cl.
| | |
|---|---|
| *E03F 5/14* | (2006.01) |
| *A01M 29/34* | (2011.01) |
| *B01D 29/56* | (2006.01) |
| *B01D 35/02* | (2006.01) |
| *B01D 39/08* | (2006.01) |
| *B01D 39/10* | (2006.01) |

(52) U.S. Cl.
CPC .............. *E03F 5/14* (2013.01); *A01M 29/34* (2013.01); *B01D 29/56* (2013.01); *B01D 35/02* (2013.01); *B01D 39/086* (2013.01); *B01D 39/10* (2013.01); *B01D 2221/12* (2013.01)

(58) Field of Classification Search
None
See application file for complete search history.

(56) References Cited

U.S. PATENT DOCUMENTS

| | | | | |
|---|---|---|---|---|
| 187,181 | A * | 2/1877 | Schmitz | B01D 61/08 |
| | | | | 137/448 |
| 195,137 | A * | 9/1877 | Baw | F16K 15/03 |
| | | | | 137/527.6 |
| 227,614 | A * | 5/1880 | Cowden | E03F 5/042 |
| | | | | 137/247.19 |
| 297,643 | A * | 4/1884 | Stark | F16K 27/006 |
| | | | | 251/95 |
| 391,339 | A * | 10/1888 | Runyan | E03F 5/046 |
| | | | | 404/4 |
| 416,830 | A * | 12/1889 | Dark | E03F 5/04 |
| | | | | 137/247.11 |
| 576,790 | A * | 2/1897 | O'Brien | E03F 5/042 |
| | | | | 137/433 |
| 623,478 | A * | 4/1899 | Keene | F16K 15/033 |
| | | | | 137/527 |
| 735,007 | A * | 7/1903 | Watson | F16K 27/12 |
| | | | | 137/526 |
| 891,012 | A * | 6/1908 | Shepard | A01M 23/08 |
| | | | | 137/527.6 |
| 929,514 | A * | 7/1909 | Tenold | B01D 35/147 |
| | | | | 137/527.6 |
| 961,834 | A * | 6/1910 | Barlett | E03F 7/06 |
| | | | | 210/446 |
| 1,000,719 | A * | 8/1911 | Cram | B01D 35/153 |
| | | | | 137/527 |

(Continued)

*Primary Examiner* — Robert J Popovics
(74) *Attorney, Agent, or Firm* — James E. Brunton

(57) ABSTRACT

A method and apparatus for preventing the escape of hazardous materials from fluid flow control systems of the character used by municipalities for carrying runoff storm water away from streets and populated areas.

4 Claims, 8 Drawing Sheets

(56) References Cited

U.S. PATENT DOCUMENTS

| | | | | |
|---|---|---|---|---|
| 1,066,316 A * | 7/1913 | Piper | E03C 1/22 | 404/5 |
| 1,327,278 A * | 1/1920 | Holman | E03F 7/06 | 210/460 |
| 1,354,879 A * | 10/1920 | Boland | F16K 15/03 | 137/448 |
| 1,397,471 A * | 11/1921 | Walker | E03F 7/06 | 43/61 |
| 1,573,929 A * | 2/1926 | Gall | B01D 29/03 | 210/301 |
| 1,593,083 A * | 7/1926 | Kirchhan | E03F 5/042 | 137/247.27 |
| 1,693,977 A * | 12/1928 | Egan | E03F 5/046 | 210/163 |
| 1,784,067 A * | 12/1930 | Holtson | A62C 4/00 | 55/505 |
| 1,887,119 A * | 11/1932 | Cornell, Jr. | F16K 24/04 | 220/372 |
| 1,897,572 A * | 2/1933 | Cornell, Jr. | F16K 15/02 | 137/550 |
| 1,978,507 A * | 10/1934 | Rand | E03C 1/106 | 4/209 FF |
| 2,709,402 A * | 5/1955 | Malm | E06B 7/02 | 52/302.1 |
| 2,800,139 A * | 7/1957 | Langdon | F16K 15/035 | 137/216.2 |
| 3,118,469 A * | 1/1964 | Schliesser | E03F 7/06 | 137/527.8 |
| 3,144,876 A * | 8/1964 | Frye | F16K 15/03 | 417/559 |
| 3,190,057 A * | 6/1965 | Sinex | E21B 43/35 | 55/501 |
| 3,372,807 A * | 3/1968 | Barnard | F01P 11/06 | 210/310 |
| 3,714,733 A * | 2/1973 | Madonna | A01M 29/34 | 43/131 |
| 3,815,629 A * | 6/1974 | Oberholtzer | F16K 15/03 | 137/527.8 |
| 3,838,706 A * | 10/1974 | Klenk | E03F 5/0407 | 137/433 |
| 3,941,151 A * | 3/1976 | Biddle | F16K 24/06 | 137/527.6 |
| 4,039,004 A * | 8/1977 | Luthy | F16K 15/03 | 137/527 |
| 4,215,716 A * | 8/1980 | Klenk | E03F 5/042 | 137/527.6 |
| 4,396,034 A * | 8/1983 | Cherniak | F16K 15/033 | 137/527 |
| 4,556,084 A * | 12/1985 | Frawley | E03C 1/1225 | 137/526 |
| 4,601,309 A * | 7/1986 | Chang | F16K 15/03 | 137/514 |
| 4,689,145 A * | 8/1987 | Mathews | B01D 29/56 | 210/260 |
| 4,747,391 A * | 5/1988 | Hanagan | A47J 37/0786 | 126/41 R |
| 4,817,583 A * | 4/1989 | Hanagan | A47J 37/0786 | 126/41 R |
| 4,867,802 A * | 9/1989 | Earl | F16K 24/06 | 137/526 |
| 4,870,992 A * | 10/1989 | Irwin | E03C 1/298 | 137/846 |
| 4,935,129 A * | 6/1990 | Wang | B01D 29/05 | 220/826 |
| 5,069,722 A * | 12/1991 | Murphy | B08B 9/0436 | 134/22.12 |
| 5,323,804 A * | 6/1994 | Lin | E03F 5/042 | 251/212 |
| 5,427,417 A * | 6/1995 | Lechuga | E03C 1/12 | 52/12 |
| D368,514 S * | 4/1996 | Crepeau | D23/261 | |
| D380,527 S * | 7/1997 | Velez | D23/261 | |
| 5,770,057 A * | 6/1998 | Filion | E03F 5/12 | 210/162 |
| 5,820,762 A * | 10/1998 | Bamer | E03F 5/0404 | 210/255 |
| 6,244,006 B1 * | 6/2001 | Shue | F24F 7/02 | 52/302.1 |
| 6,298,011 B1 * | 10/2001 | Nyberg | A01M 1/226 | 367/139 |
| 6,319,397 B1 * | 11/2001 | Su | E03F 5/0405 | 210/163 |
| 6,735,790 B1 * | 5/2004 | Willson | E03C 1/1225 | 4/321 |
| 6,959,457 B2 * | 11/2005 | Hernandez | F24F 7/02 | 454/4 |
| 7,083,721 B2 * | 8/2006 | McClure | E03F 1/00 | 210/162 |
| 7,163,635 B2 * | 1/2007 | Fitzgerald | E03F 5/0404 | 210/170.03 |
| 7,300,574 B1 * | 11/2007 | Lewis | E03F 5/0404 | 210/473 |
| 7,455,766 B1 * | 11/2008 | Lewis | E03F 5/0404 | 210/473 |
| 7,540,953 B2 * | 6/2009 | Fitzgerald | C02F 1/004 | 210/170.03 |
| 7,563,453 B2 * | 7/2009 | Dupree | A01N 25/34 | 424/408 |
| 7,658,857 B2 * | 2/2010 | Wacome | E03F 5/0404 | 210/170.03 |
| 7,682,104 B2 * | 3/2010 | Wassman | E01F 5/005 | 210/170.03 |
| 7,686,961 B1 * | 3/2010 | Glynne | E03F 5/14 | 210/170.03 |
| 7,857,966 B2 * | 12/2010 | Duran | C02F 1/28 | 210/170.03 |
| 7,866,334 B2 * | 1/2011 | McIntire | E03F 5/08 | 137/433 |
| 7,886,765 B2 * | 2/2011 | Chalich | F16K 15/03 | 137/526 |
| 7,988,870 B2 * | 8/2011 | Belasco | E03F 5/0404 | 210/170.03 |
| 8,012,346 B2 * | 9/2011 | Peters, Jr. | E03F 1/00 | 210/170.03 |
| 8,216,453 B2 * | 7/2012 | Moody | E03F 5/0404 | 210/232 |
| 8,273,162 B2 * | 9/2012 | Pagano | B01D 53/0407 | 96/108 |
| 8,277,646 B2 * | 10/2012 | Singleton | C02F 1/006 | 210/163 |
| 8,323,485 B2 * | 12/2012 | Blundell | E03F 1/002 | 210/170.03 |
| 8,459,298 B1 * | 6/2013 | Valdez | E03F 7/06 | 137/315.16 |
| 8,557,108 B2 * | 10/2013 | Rennels | E03C 1/264 | 210/163 |
| 8,591,729 B2 * | 11/2013 | Alqanee | E03F 5/0405 | 210/170.03 |
| 8,623,203 B2 * | 1/2014 | Peters, Jr. | B01D 29/902 | 210/170.03 |
| 8,679,328 B2 * | 3/2014 | Hebert | E03F 5/0404 | 210/163 |
| 8,679,329 B2 * | 3/2014 | Vreeland | E03F 5/0404 | 210/170.03 |
| 8,834,613 B2 * | 9/2014 | Kwon | A61L 9/16 | 96/108 |
| 9,038,661 B2 * | 5/2015 | Lin | E03F 5/0407 | 137/532 |
| 9,044,001 B2 * | 6/2015 | Meghji | A01M 1/026 | |
| 9,045,891 B2 * | 6/2015 | Peters, Jr. | B01D 29/902 | |
| 9,139,991 B2 * | 9/2015 | Huber | E03C 1/298 | |
| 9,249,553 B2 * | 2/2016 | Perron | B01D 46/0028 | |
| 9,416,986 B2 * | 8/2016 | Huber | E03F 5/042 | |
| 9,863,546 B2 * | 1/2018 | Chen | F16K 15/033 | |
| 10,053,382 B2 * | 8/2018 | Wilkie | C02F 1/004 | |
| 10,072,410 B2 * | 9/2018 | Damgaard Jensen | E03F 7/04 | |
| 10,178,860 B2 * | 1/2019 | Wesson | A01M 1/106 | |
| 10,180,260 B2 * | 1/2019 | Mantyla | F16K 24/04 | |

(56) References Cited

U.S. PATENT DOCUMENTS

| | | | | |
|---|---|---|---|---|
| 10,240,705 | B1* | 3/2019 | Zamkochyan | E03F 7/04 |
| 10,335,724 | B1* | 7/2019 | Morris | B01D 39/1692 |
| 10,407,891 | B1* | 9/2019 | Sanguinetti | E03F 5/0404 |
| 10,415,712 | B2* | 9/2019 | Chen | F16K 15/033 |
| 10,465,371 | B2* | 11/2019 | Wacome | E03F 5/0404 |
| 10,486,990 | B2* | 11/2019 | Epstein | E03F 5/06 |
| 10,631,688 | B2* | 4/2020 | Peters | F16K 1/16 |
| 10,648,165 | B1* | 5/2020 | Friezner | G01N 1/18 |
| 10,662,637 | B2* | 5/2020 | Moran | B01D 21/0039 |
| 10,676,913 | B2* | 6/2020 | Lopez, Jr. | E03F 7/06 |
| 10,786,765 | B2* | 9/2020 | DiLalla | B01D 29/27 |
| 10,837,177 | B2* | 11/2020 | Valdez | F16K 15/033 |
| 10,982,425 | B1* | 4/2021 | Grumbach | E03F 5/041 |
| 10,989,437 | B1* | 4/2021 | Dolan | F24F 13/082 |
| 10,995,483 | B1* | 5/2021 | Sanguinetti | E03F 5/0404 |
| 11,047,494 | B2* | 6/2021 | Chen | F16K 24/06 |
| 11,124,958 | B1* | 9/2021 | Gagliardi | E03F 5/0403 |
| 11,186,980 | B2* | 11/2021 | Yeoman | B01D 21/0048 |
| 11,242,678 | B2* | 2/2022 | Grumbach | C02F 3/342 |
| 11,320,057 | B2* | 5/2022 | Bouchard | E03F 7/06 |
| 11,432,540 | B1* | 9/2022 | Draeger | A01M 1/106 |
| 11,459,744 | B2* | 10/2022 | Swope | C02F 1/001 |
| 11,470,838 | B2* | 10/2022 | Sørensen | E03F 7/06 |
| 11,724,224 | B2* | 8/2023 | Morris | B01D 29/03 210/500.1 |
| 11,761,190 | B2* | 9/2023 | Yeoman | E03F 5/0404 210/747.2 |
| 11,795,067 | B2* | 10/2023 | Liberman | A01K 79/02 |
| 11,877,573 | B2* | 1/2024 | Friezner | E03F 1/002 |
| 2003/0053862 | A1* | 3/2003 | Shaw | E03F 1/00 405/40 |
| 2003/0110554 | A1* | 6/2003 | Hernandez | F24F 7/02 454/367 |
| 2004/0099586 | A1* | 5/2004 | Imoto | E03F 5/08 210/85 |
| 2004/0128903 | A1* | 7/2004 | Wexler | A01M 29/34 43/122 |
| 2004/0226869 | A1* | 11/2004 | McClure | E03F 5/0404 210/163 |
| 2004/0256298 | A1* | 12/2004 | Curtolo | E03F 5/0404 210/163 |
| 2005/0081428 | A1* | 4/2005 | Ramsey | A01M 7/0046 43/132.1 |
| 2005/0092372 | A1* | 5/2005 | Wade | F16K 15/03 137/527.6 |
| 2005/0230317 | A1* | 10/2005 | Belasco | E03F 5/0404 210/163 |
| 2006/0102543 | A1* | 5/2006 | Peters | E03F 5/0404 210/170.03 |
| 2006/0169648 | A1* | 8/2006 | Fitzgerald | E03F 1/00 210/170.03 |
| 2006/0234867 | A1* | 10/2006 | Dupree | A01N 25/08 504/358 |
| 2006/0243268 | A1* | 11/2006 | Jacklich | F24F 7/00 126/85 B |
| 2007/0215216 | A1* | 9/2007 | Farruggia | F16K 15/038 137/512 |
| 2007/0262009 | A1* | 11/2007 | Fitzgerald | E03F 5/0404 210/170.03 |
| 2008/0145150 | A1* | 6/2008 | Shaw | E03F 1/00 405/36 |
| 2009/0008588 | A1* | 1/2009 | Giehl | E03F 7/06 251/157 |
| 2009/0039022 | A1* | 2/2009 | Belasco | E03F 5/14 210/651 |
| 2009/0279954 | A1* | 11/2009 | Griffith | E03F 7/06 405/125 |
| 2009/0297271 | A1* | 12/2009 | Hummert | F16K 21/20 405/51 |
| 2010/0018593 | A1* | 1/2010 | Farruggia | F16K 15/038 137/527 |
| 2010/0101986 | A1* | 4/2010 | Pagano | B01D 53/0407 210/151 |
| 2010/0170836 | A1* | 7/2010 | Pagano | B01D 53/0407 210/151 |
| 2011/0000837 | A1* | 1/2011 | Roy | E03F 5/102 210/164 |
| 2011/0240536 | A1* | 10/2011 | Tseng | E03F 5/042 210/136 |
| 2012/0097617 | A1* | 4/2012 | Blundell | E03F 5/0404 210/170.03 |
| 2012/0192950 | A1* | 8/2012 | Huber | E03C 1/298 137/1 |
| 2012/0222996 | A1* | 9/2012 | Rennels | E03C 1/264 210/163 |
| 2012/0241028 | A1* | 9/2012 | Kirk | E03F 7/06 137/527 |
| 2012/0258656 | A1* | 10/2012 | Raimondi | F24F 13/082 454/367 |
| 2013/0065504 | A1* | 3/2013 | Alemao | E03F 5/08 454/275 |
| 2013/0065506 | A1* | 3/2013 | Alemao | F24F 7/02 454/367 |
| 2014/0165835 | A1* | 6/2014 | Perron | E03F 5/08 96/222 |
| 2014/0332452 | A1* | 11/2014 | Wacome | E03F 5/0404 210/170.03 |
| 2014/0373943 | A1* | 12/2014 | Huber | F16K 15/031 137/512 |
| 2015/0247583 | A1* | 9/2015 | Garnett | F16K 17/20 137/15.04 |
| 2015/0260310 | A1* | 9/2015 | Bahalul | F16K 37/0041 137/557 |
| 2017/0136392 | A1* | 5/2017 | Perry | B01D 29/58 |
| 2018/0016792 | A1* | 1/2018 | Valdez | F16L 37/02 |
| 2018/0044906 | A1* | 2/2018 | McAlpine | E03F 7/06 |
| 2018/0208482 | A1* | 7/2018 | Grubb | C02F 1/004 |
| 2018/0310772 | A1* | 11/2018 | Peters | A47J 43/28 |
| 2018/0320924 | A1* | 11/2018 | Bryant | F24F 13/082 |
| 2018/0363285 | A1* | 12/2018 | Robinson | E03F 3/046 |
| 2019/0104716 | A1* | 4/2019 | Erton | A01M 23/005 |
| 2019/0145654 | A1* | 5/2019 | Bryant | F16L 55/24 138/96 R |
| 2019/0293193 | A1* | 9/2019 | Fink | F16K 1/42 |
| 2020/0236922 | A1* | 7/2020 | Sørensen | E03F 7/06 |
| 2020/0370290 | A1* | 11/2020 | Yeoman | B01D 21/0039 |
| 2021/0214930 | A1* | 7/2021 | Joyce | E03F 7/06 |
| 2021/0387300 | A1* | 12/2021 | Li | F16N 7/32 |
| 2022/0025633 | A1* | 1/2022 | Yeoman | E03F 5/0404 |
| 2022/0098848 | A1* | 3/2022 | Waterman | B32B 27/40 |
| 2022/0167609 | A1* | 6/2022 | Friezner | E03F 5/041 |
| 2022/0251819 | A1* | 8/2022 | Friezner | E03F 5/107 |
| 2023/0235545 | A1* | 7/2023 | Duban | E03F 5/041 4/679 |

* cited by examiner

METHOD AND APPARATUS FOR CONTROLLING HAZARDOUS MATERIALS DISPOSED WITHIN A STORM WATER CONTROL SYSTEM

CROSS-REFERENCE TO RELATED APPLICATIONS

This is a Non-Provisional Application claiming the benefit of co-pending Provisional Application No. 63/147,503 filed Feb. 9, 2021.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

Field of the Invention

The present invention relates generally to a method and apparatus for controlling the egress of hazardous materials from storm water control systems. More particularly, the invention concerns a method and apparatus for preventing the egress of hazardous gases from storm water control systems and for abatement of insects, including mosquitoes, that reside within the tubular portion of storm water control systems.

Description of Related Art Including Information Disclosed Under 37 CFR 1.97 and 1.98

The control of excess runoff rain water has long been a problem faced by municipalities throughout the United States. Heavy rainfall can create large volumes of runoff that must be handled effectively in order to avoid flooding, that can result in road closures and substantial property damage. Accordingly, most municipalities have installed drain systems that include curbside drains that are provided at spaced apart locations along most thoroughfares. The curbside drains typically lead to main drain pipes that carry the water to adjacent rivers, directly to the ocean, or to remote catch basins.

While the prior art drain systems have, for the most part, proven effective in carrying runoff storm water away from the streets and populated areas, the control of natural debris and hazardous man-made debris entering the drain systems and remaining therein remains a major problem. For this reason, various attempts have been made in the past to prevent unwanted debris from entering into curb side drains. A highly successful system for preventing large volumes of unwanted debris from entering into curb side drains is described in U.S. Pat. No. 9,428,899 issued to the present inventor.

Debris that resides within the tubular portion of storm water control systems can cause numerous problems, including the build up of hazardous gases that over time escape from the system, create foul smells and causes various types of health hazards to persons exposed to the gases. Additionally, since the storm water structures temporarily, or permanently retain runoff water that keeps the debris moist the storm water structures become ideal insect breeding areas.

Insect abatement and particularly mosquito abatement continues to present major nationwide problems. As recently observed by the American Mosquito Control Association, some sort of organized mosquito control programs exist at the State, County or city level. These programs include permanent measures such as draining swampy mosquito breeding areas and temporary measures such as aerosol spraying by ground or aerial equipment to kill adult and larval mosquitoes.

Mosquitoes can breed in any standing water, but they are particularly drawn to standing water containing substantial amounts of organic debris. Accordingly, storm water structures that temporarily, or permanently retain runoff water and organic debris require particular attention as likely mosquito breeding areas. It is a principal objective of the present invention to develop measures for the effective abatement of insects and particularly mosquitoes in such structures.

BRIEF SUMMARY OF THE INVENTION

By way of brief summary, the present invention comprises methods and apparatus for controlling the egress of hazardous matter from storm water control systems. More particularly, the invention concerns a method and apparatus for preventing the egress of hazardous gases from storm water control systems and for abatement of insects, including mosquitoes, that reside within the tubular portion of storm water control systems. One form of the method of the invention comprises the steps of covering the fluid outlet of the tubular drain portion of the apparatus with a barrier that will block the egress of hazardous gases there from, but will permit the free flow of liquid therethrough. The barrier can be constructed from various materials, but in the preferred form of the invention the barrier comprises a yieldably deformable butyl rubber. Another form of the method of the invention comprises the steps of covering both the fluid inlet and the fluid outlet of the tubular drain portion of the apparatus with a barrier that will block the egress of mosquitoes from the tubular drain portion but will permit the free flow of liquid therethrough. The barrier can be constructed from various materials, but in the preferred form of the invention the barrier comprises a yieldably deformable porous material having between 280 and 800 perforations per square inch. The porous material used to construct the barrier can comprise metal, cloth, plastic and the like.

With the forgoing in mind, it is a primary object of the invention to provide a method and apparatus for preventing the escape of hazardous materials from fluid flow control systems of the character used by municipalities for carrying runoff storm water away from streets and populated areas.

More particularly, it is an object of the invention to provide a method and apparatus for preventing the escape of hazardous gases from fluid flow control systems.

Another object of the invention is to provide a method and apparatus for blocking the egress of mosquitoes from fluid flow control systems.

Another object of the invention is to provide an apparatus of the character described in the preceding paragraph that includes a porous barrier constructed from fabric or metal mesh that will block the egress of mosquitoes from the tubular drain portion of the fluid control system but will permit the free flow of liquid therethrough.

Another object of the invention is to provide an apparatus of the character described in the preceding paragraph in which the barrier material exhibits a porosity of between about 280 and about 800 perforations per square inch.

Another object of the invention is to provide an apparatus of the character described in which the barrier material is easy to install and in no way affects the structural integrity of the storm drain.

DETAILED DESCRIPTION OF THE INVENTION

Figure 1:
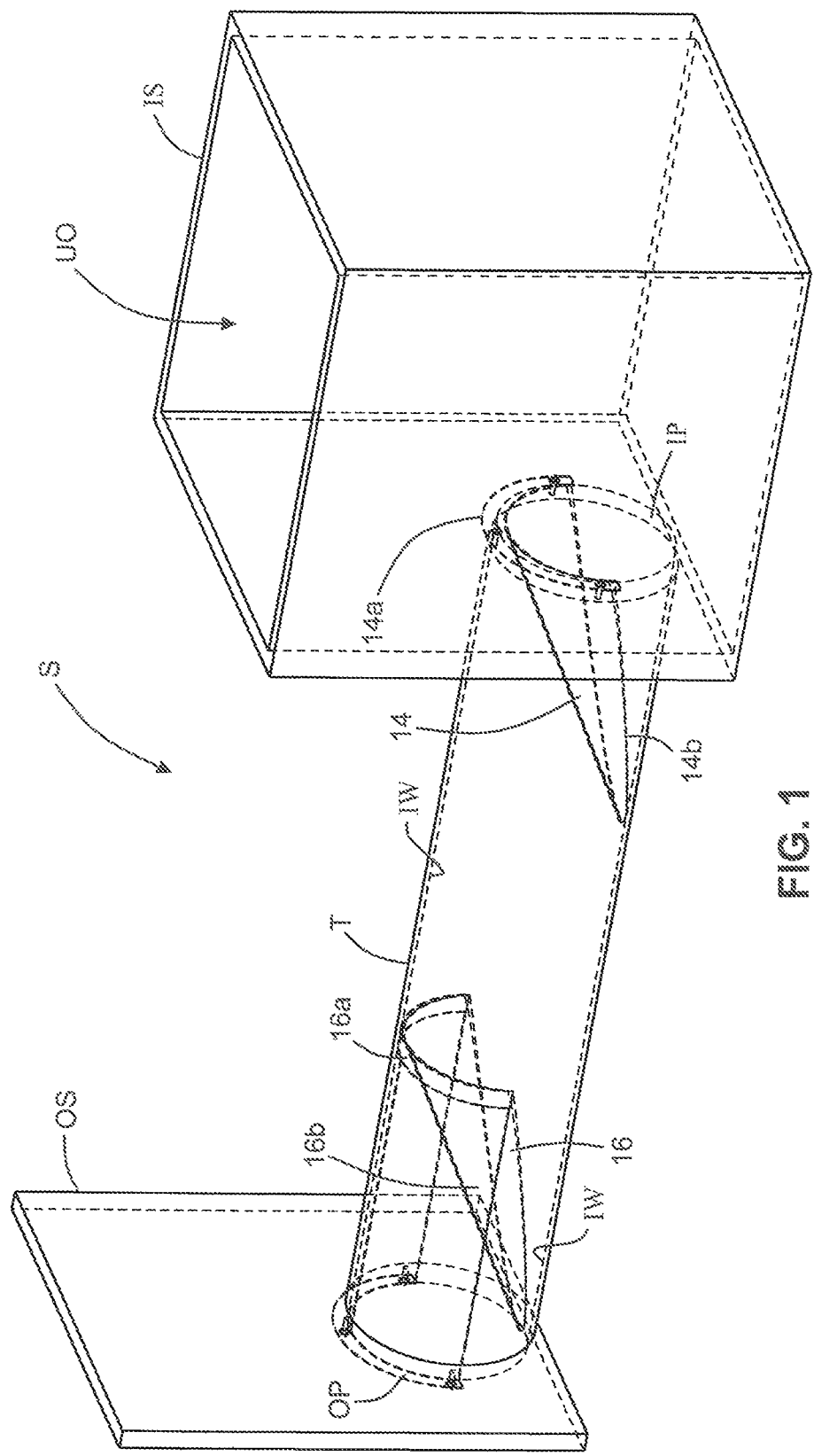
FIG. 1 is a generally perspective view of one form of the apparatus of the invention for blocking the egress of hazardous gases from the tubular portion of a conventional storm water control system showing the barrier portions thereof disposed in a closed blocking orientation.

Referring to the drawings and particularly to FIGS. 1 through 4, one form of the apparatus of the invention for blocking the egress of hazardous matter in the form of hazardous gases from the tubular portion "T" a of a conventional storm water control system "S" is there shown as it appears when positioned within the storm water control system. This embodiment of the apparatus comprises a first yieldably deformable matter blocking barrier 14 that is connected to the inlet portion "IP" of the tubular portion "T". Tubular portion "T" extends between the drain water inlet structure "IS" of the storm water control system and the drain water outlet structure "OS" of the system. Barrier 14, which can be constructed of various durable materials such as butyl rubber, includes a generally semicircular connector portion 14a that is connected to inlet portion "IP" and an elongate tapered portion 14b that extends into tubular portion "T" in the manner shown in FIGS. 1 and 3. Barrier 14 is movable between the first downwardly extending, blocking position shown in FIGS. 1 and 3 and a second upwardly extending, fluid flow position shown in FIGS. 2 and 4 of the drawings.

This first embodiment of the apparatus of the invention also comprises a second yieldably deformable barrier 16 that is connected to the inner wall "IW" of the tubular portion "T" in the manner shown in in FIGS. 1 through 4 of the drawings. Barrier 16, which is of similar construction to barrier 14 can also be constructed of various durable materials such as butyl rubber. Barrier 16 includes a semicircular connector portion 16a that is connected to inner wall "IW" and an elongate tapered portion 16b that is housed within tubular portion "T" in the manner shown in FIGS. 1 and 3. Barrier 16, like barrier 14, is movable between the first downwardly extending, blocking position shown in FIGS. 1 and 3 and a second upwardly extending, fluid flow position shown in FIGS. 2 and 4 of the drawings.

In accordance with one form of the method of the present invention, access to the inlet portion "IP" of tubular portion "T" is obtained via the upper opening "UO" of the storm water control system (FIG. 1) so that the barrier 14 can be connected to the tubular portion in the manner shown in FIGS. 1 through 4. In its at rest position, the body portion 14b of the barrier sealably engages the inner wall of the tubular portion in the manner shown in FIG. 1. In this position, barrier 14 effectively blocks the flow of hazardous and noxious gases outwardly of the inlet of the tubular portion and toward the opening of the inlet structure "IS".

Figure 2:
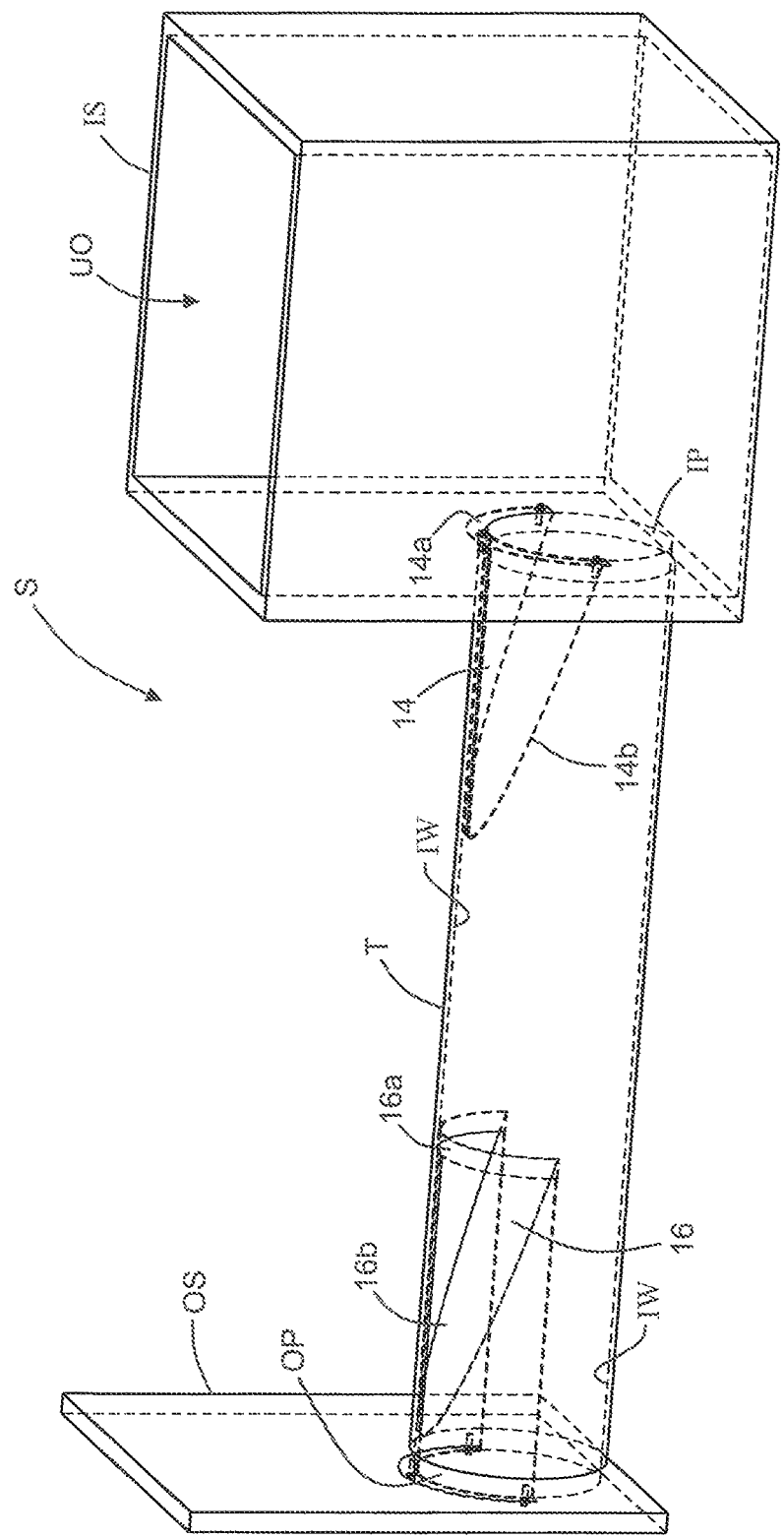
FIG. 2 is a generally perspective view similar to FIG. 1 but showing the barrier portion thereof disposed in an open orientation to permit the flow of liquids through the tubular portion.
Figure 3:
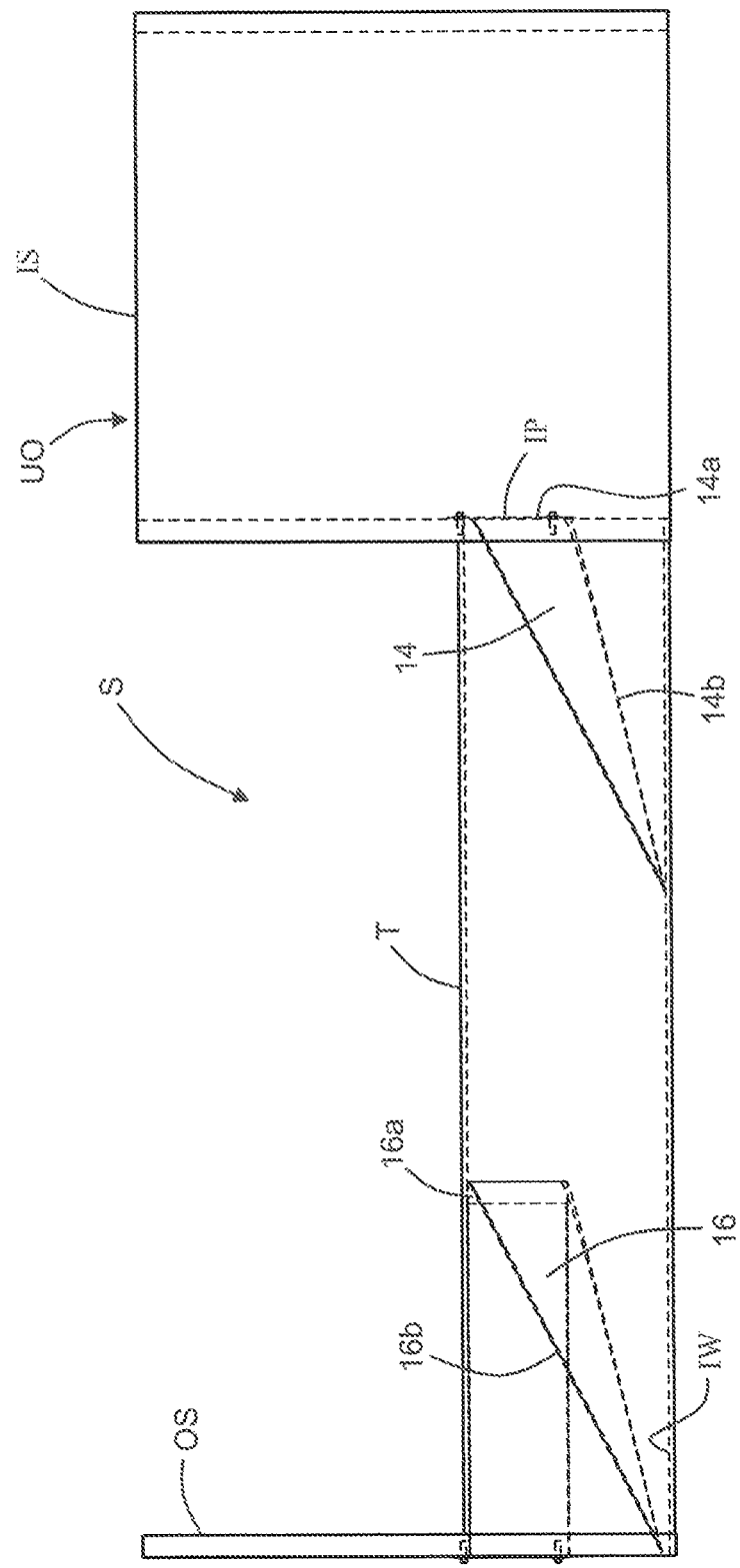
FIG. 3. is a side elevational view of one form of the apparatus of the invention for blocking the egress of hazardous gases from the tubular portion of a conventional storm water control system showing the barrier portions thereof disposed in a closed blocking orientation.
Figure 4:
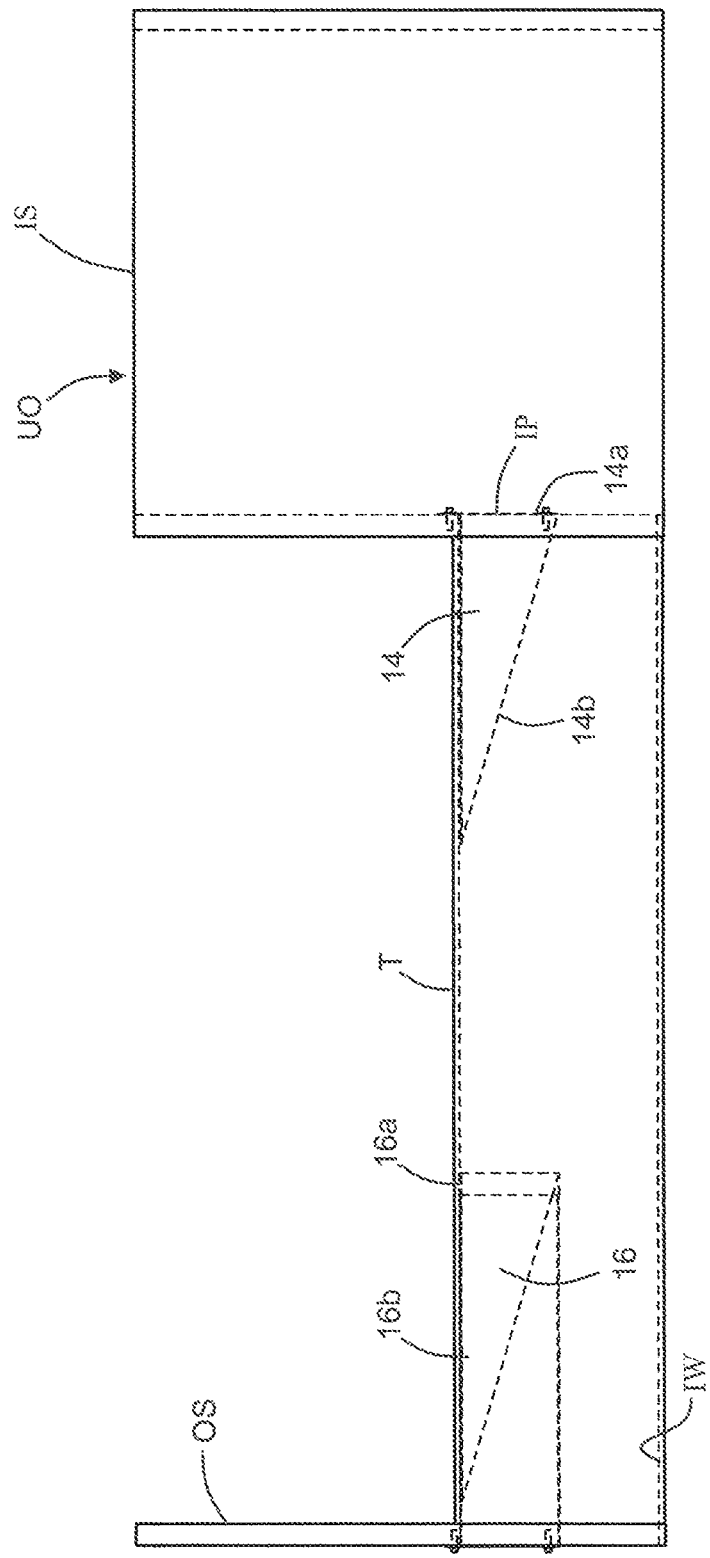
FIG. 4 is a side elevational view similar to FIG. 3 but showing the barrier portion thereof disposed in an open orientation to permit the flow of liquids through the tubular portion.

In a similar manner, barrier 16 is inserted into the outlet end of the tubular portion via outlet port "OP" in the manner shown in FIG. 1 so that it blocks the flow of gases outwardly there through. However, as illustrated in FIGS. 2 and 4 of the drawings, because of the flexibility of barriers 14 and 16, water flowing into the storm drain will cause the barriers to move into their second open position shown in FIGS. 2 and 4 allowing the fluid to flow freely through the tubular portion "T" and outwardly of the storm water control system.

Referring now to FIGS. 5 through 8 of the drawings, another form of the apparatus of the invention is there shown. This embodiment concerns an apparatus for blocking the egress of insects from the tubular portion "T" of a conventional storm water control system "S". The apparatus of this latest form of the invention comprises a first yieldably deformable porous barrier 20 that is connected to the inlet portion "IP" of the tubular portion "T". As before, tubular portion "T" extends between the drain water inlet structure "IS" of the storm water control system and the drain water outlet structure "OS" of the system. Barrier 20, which can be constructed of various porous fabric and metal, includes a semicircular connector portion 20a that is connected to inlet portion "IP" and an elongate tapered portion 20b that extends into tubular portion "T" in the manner shown in FIGS. 5 and 7. Tapered portion 20b of barrier 20 comprises a yieldably deformable porous material having between about 280 and 800 perforations per square inch. Barrier 20 is movable between the first downwardly extending, blocking position shown in FIGS. 5 and 7 and a second upwardly extending, fluid flow position shown in FIGS. 6 and 8 of the drawings.

This second embodiment of the apparatus of the invention also comprises a second yieldably deformable barrier 22 that is connected to the inner wall "IW" of the tubular portion "T" in the manner shown in FIGS. 5 through 8 of the drawings. Barrier 22, which is of similar construction to barrier 20 can also be constructed of various porous materials such as fabrics and metal. Barrier 22 includes a semicircular connector portion 22a that is connected to inner wall "IW" and an elongate tapered portion 22b that is housed within tubular portion "T" in the manner shown in FIGS. 5 and 7. Tapered portion 22b like tapered portion 20b comprises a yieldably deformable porous material having between about 280 and 800 perforations per square inch. Barrier 22, like barrier 14, is movable between the first downwardly extending, blocking position shown in FIGS. 5 and 7 and a second upwardly extending, fluid flow position shown in FIGS. 6 and 8 of the drawings.

In accordance with another form of the method of the present invention, access to the inlet portion "IP" of tubular portion "T" is obtained via the upper opening "UO" of the storm water control system (FIG. 5) so that the barrier 20 can be connected to the tubular portion in the manner shown in FIGS. 5 through 8. In it's at rest position, the body portion 20b of the barrier sealably engages the inner wall of the tubular portion in the manner shown in FIG. 5. In this position, barrier 20 effectively blocks the movement toward the inlet of the tubular portion of insects, including mosquitoes and mosquito larvae that are residing in the debris housed within the tubular portion.

Figure 5:
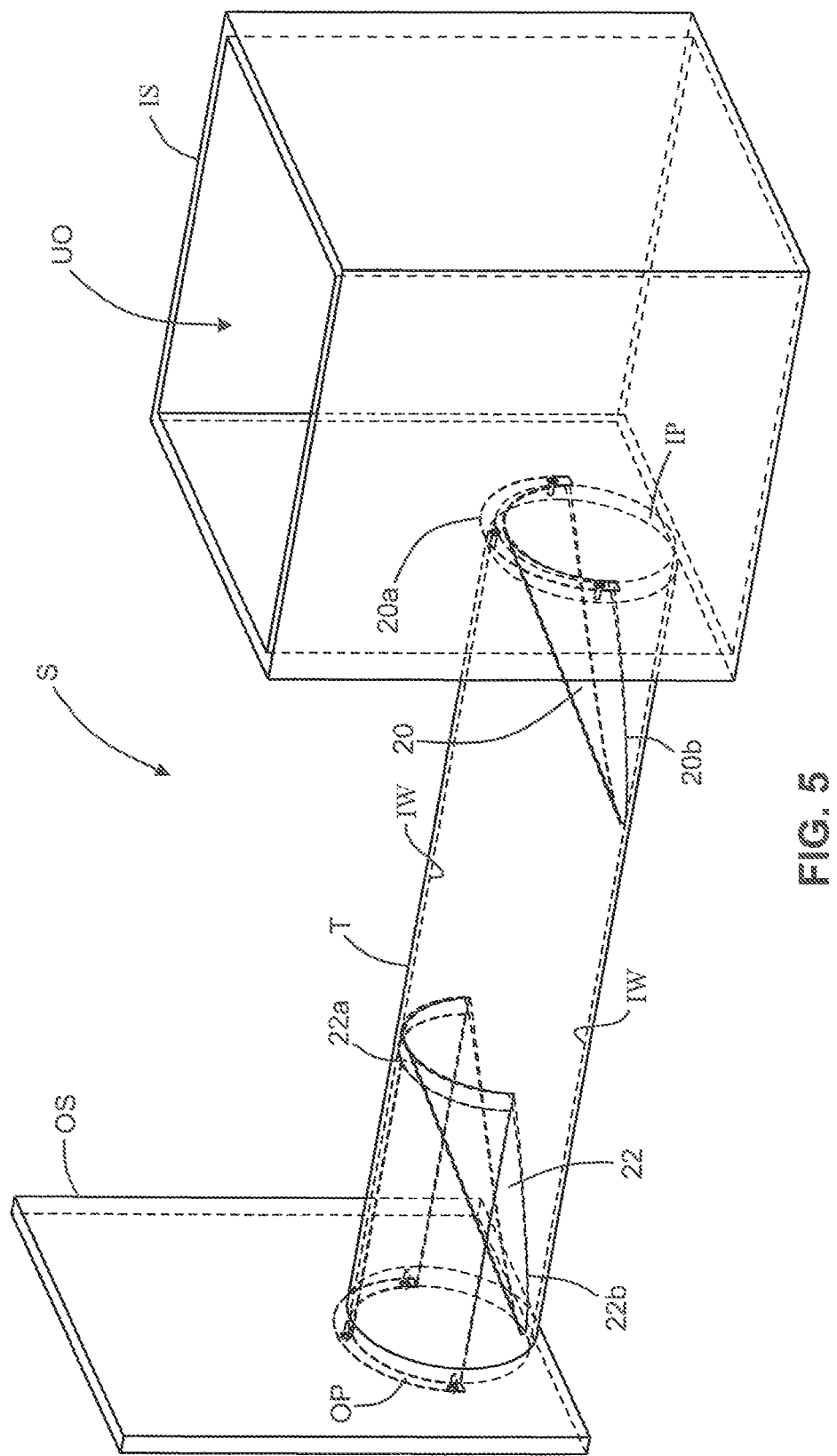
FIG. 5 is a generally perspective view of another form of the apparatus of the invention for abatement of insects, including mosquitoes, that reside within the tubular portion of storm water control systems showing the barrier portions thereof disposed in a closed blocking orientation.
Figure 6:
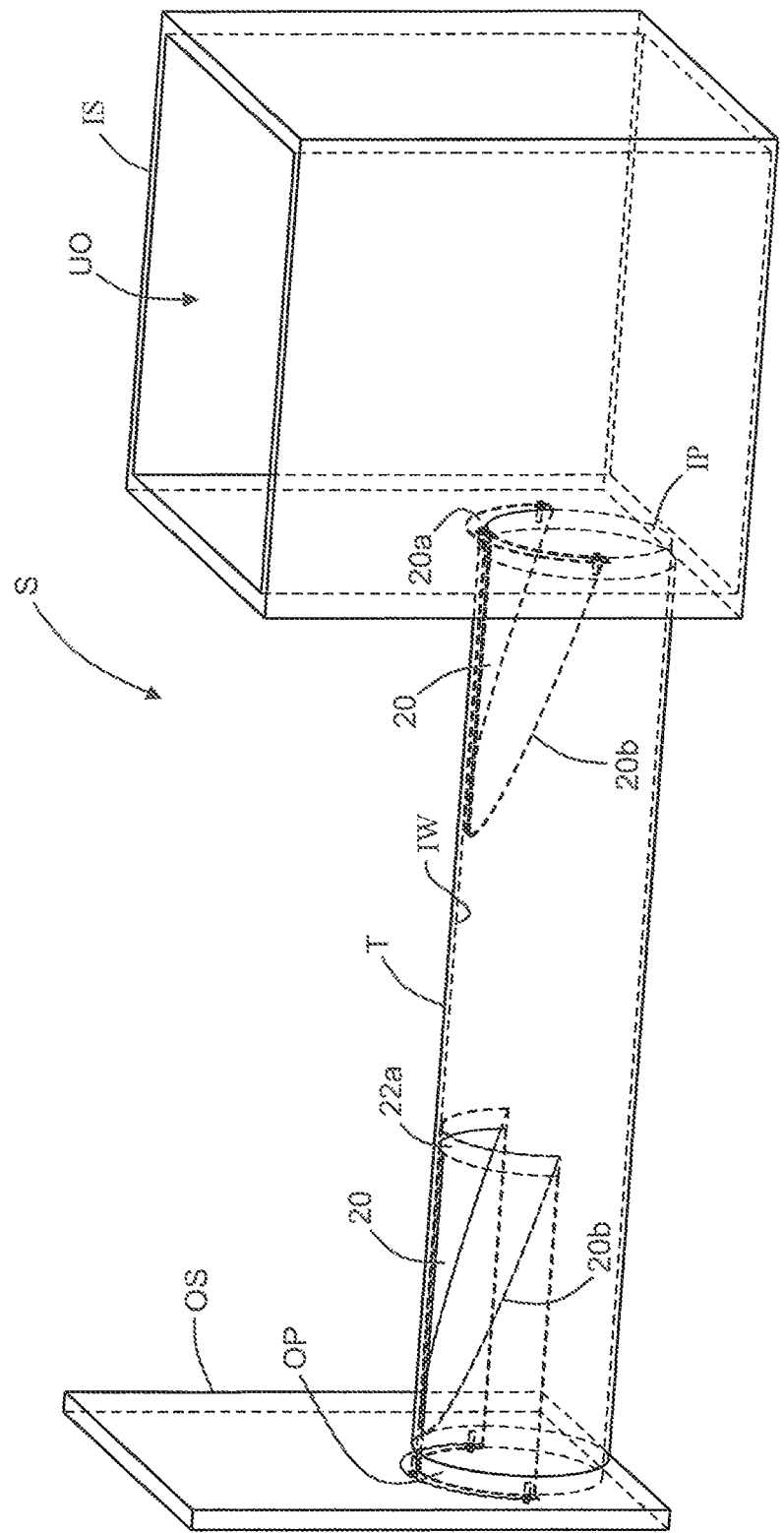
FIG. 6 is a generally perspective view similar to FIG. 5 but showing the barrier portion thereof disposed in an open orientation to permit the flow of liquids through the tubular portion.
Figure 7:
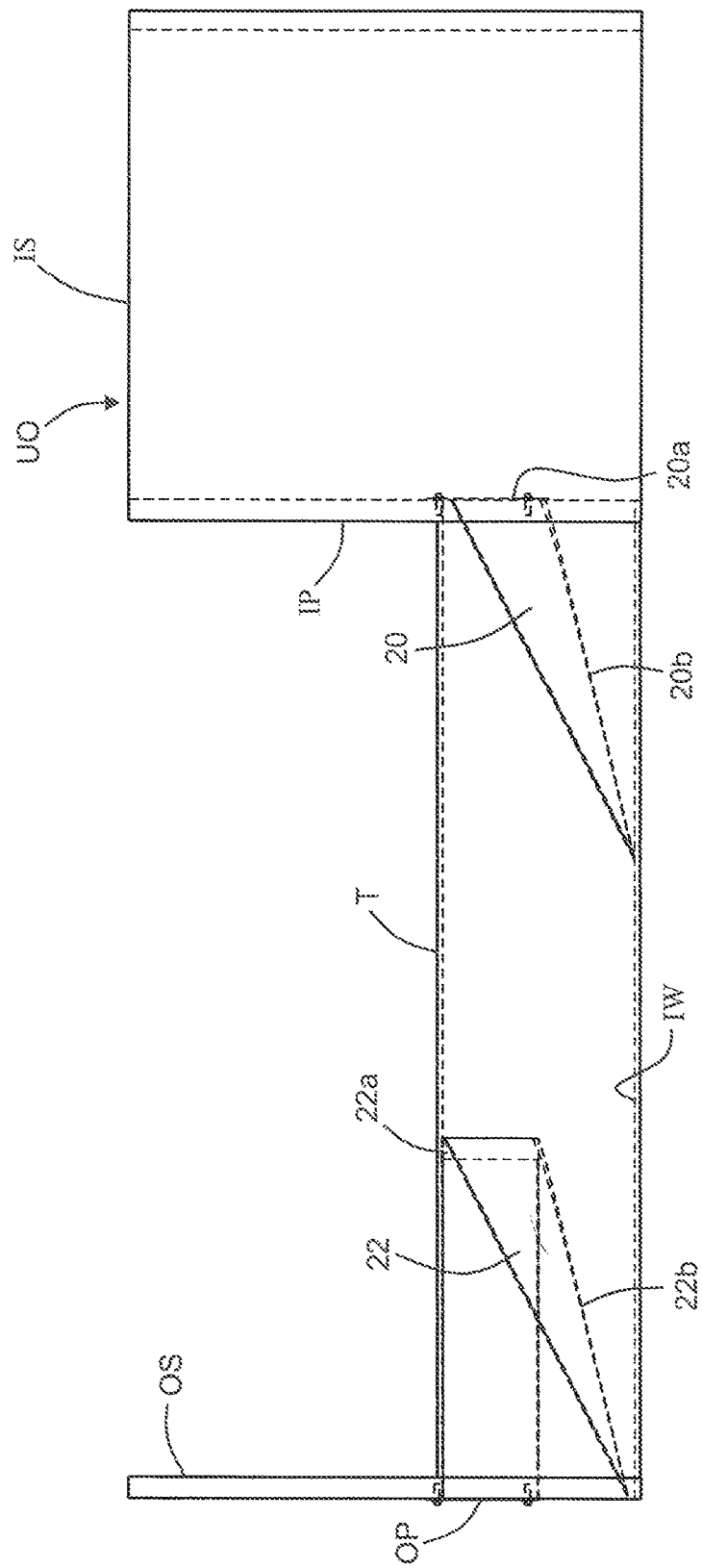
FIG. 7 is a side elevational view of another form of the apparatus of the invention for abatement of insects, including mosquitoes, that reside within the tubular portion of storm water control systems showing the barrier portions thereof disposed in a closed blocking orientation.
Figure 8:
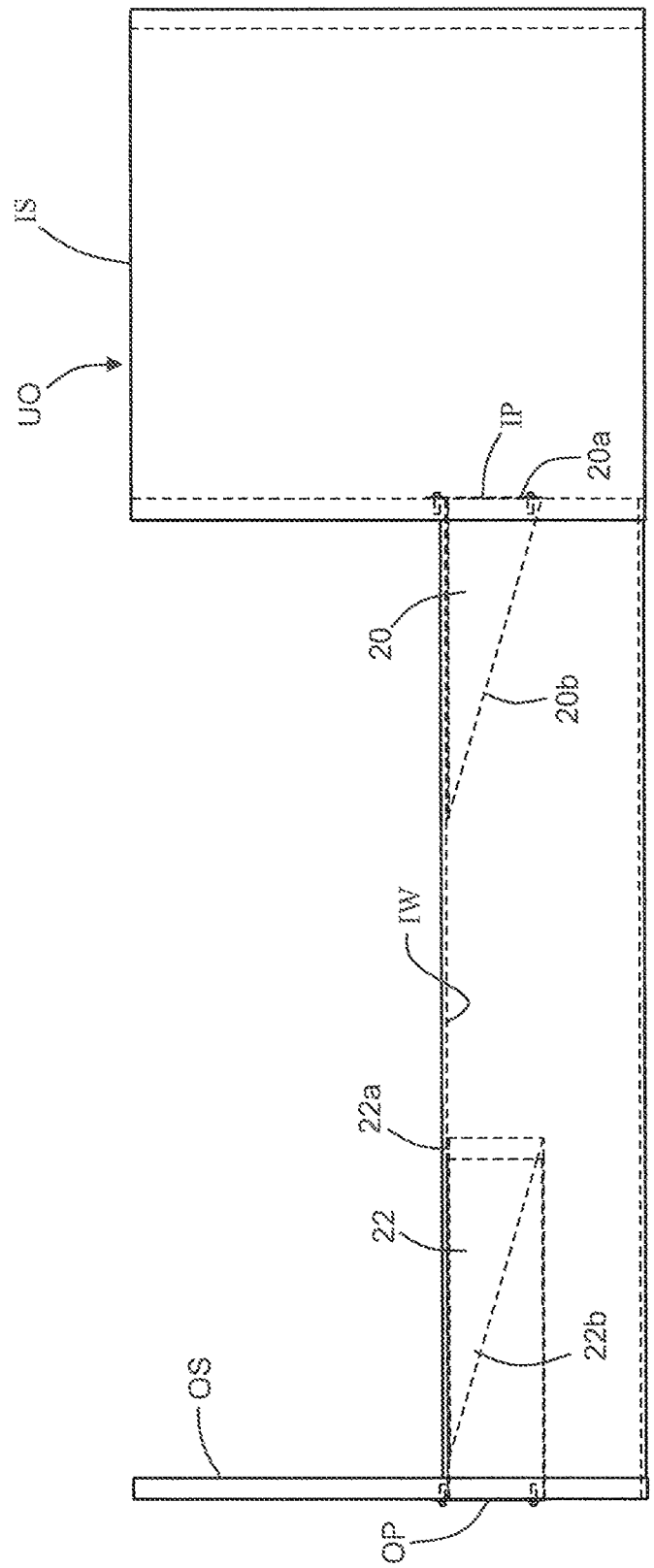
FIG. 8 is a side elevational view similar to FIG. 7, but showing the barrier portion thereof disposed in an open orientation to permit the flow of liquids through the tubular portion.

In a similar manner, barrier 22 is inserted into the outlet end of the tubular portion via outlet port "OP" in the manner shown in FIG. 5 so that it blocks the movement toward the outlet of the tubular portion of insects, including mosquitoes and mosquito larvae that are residing in the debris housed within the tubular portion. However, as illustrated in FIGS. 6 and 8 of the drawings, because of the flexibility of barriers 20 and 22, water flowing into the storm drain will cause the barriers to move into their second open position shown in FIGS. 6 and 8 allowing the fluid to flow freely through the tubular portion "T" and outwardly of the storm water control system.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention as set forth in the following claims.

I claim:

1. A method for abatement of flying insects in a storm water drain having drain water inlet structure (IS) defining a chamber in fluid communication with a fluid outlet structure (OS) having an outlet extending therethrough, with a tubular conduit (T) interposed between the drain water inlet structure (IS) and the fluid outlet structure (OS), the method comprising the steps of:

installing a first, yieldably deformable porous barrier (20) having 280-800 perforations per square inch, by spanningly connecting it at an angle to an upper portion of the tubular conduit (T) at a point adjacent to the drain water inlet structure (IS) such that a lower portion of the yieldably deformable porous barrier (20) contacts the tubular conduit (T) at a point further downstream relative to the drain water inlet structure (IS);

installing a second, yieldably deformable porous barrier (22) having 280-800 perforations per square inch, by spanningly connecting it at an angle to an upper portion of the tubular conduit (T) at a point upstream of the fluid outlet structure (OS) such that a lower portion of the yieldably deformable porous barrier (22) contacts the tubular conduit at a point adjacent to the outlet of the outlet structure (OS); and allowing storm water to flow from the drain water inlet structure (IS) through the tubular conduit (T) to the outlet, with the yieldably deformable barriers (20,22) temporarily deforming as needed to permit the flow, while preventing flying insects from traversing the tubular conduit (T) at other times.

2. The method as defined in claim 1 wherein the yieldably deformable porous barriers (20,22) comprise a metal screen.

3. The method as defined in claim 1 wherein the yieldably deformable porous barriers (20,22) comprise a cloth.

4. The method as defined in claim 1 wherein the yieldably deformable porous barriers (20,22) prevent mosquitoes and/or mosquito larvae from traversing the tubular conduit (T).

\* \* \* \* \*